Feb. 21, 1933.  J. C. McCUNE  1,898,557
CONTROL PEDAL
Filed May 22, 1930
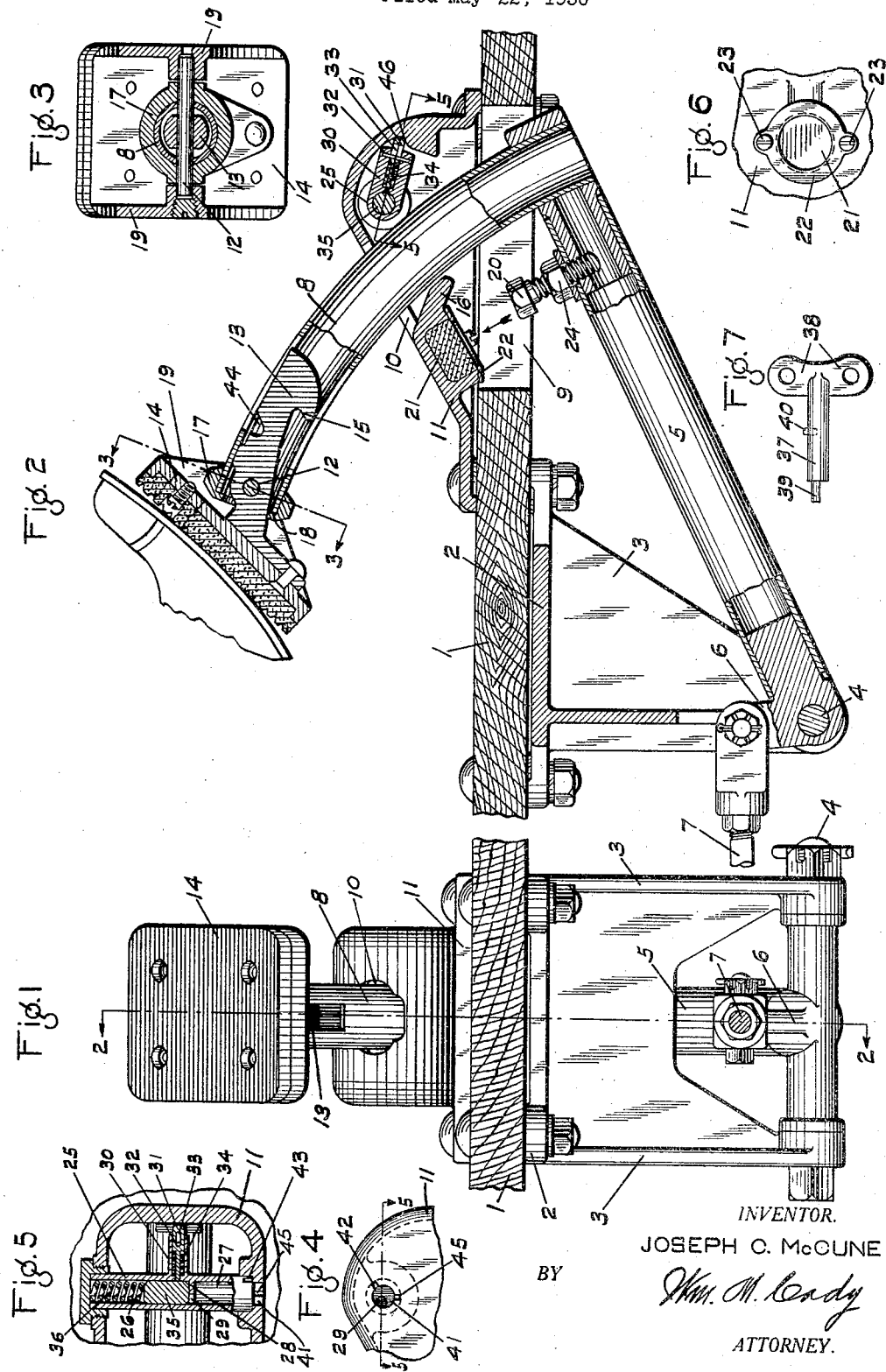
INVENTOR.
JOSEPH C. McCUNE
BY Wm. M. Cady
ATTORNEY.

Patented Feb. 21, 1933

1,898,557

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

CONTROL PEDAL

Application filed May 22, 1930. Serial No. 454,550.

The invention relates to control levers and more particularly to the foot controlled type employed in safety car control equipment.

One object of my invention is to provide an improved foot controlled pedal lever for controlling the operation of safety car control equipment.

Another object of my invention is to provide a safety car control foot pedal lever, having a service application position and a foot off or emergency position, with means for holding said pedal lever in service application position against movement to its emergency position upon the removal of the operator's foot therefrom.

A further object of my invention is to provide improved means for locking the foot controlled pedal lever in service application position.

Other objects and advantages will appear in the following more detailed description of the invention.

In the accompanying drawing; Fig. 1 is a cross sectional view through a portion of the car showing my pedal lever and its mounting; Fig. 2 is a longitudinal sectional view of the same taken on the line 2—2 of Fig. 1, portions of the pedal lever being shown in elevation; Fig. 3 is a sectional view taken on the line 3—3 of Fig. 2; Fig. 4 is an end elevational view of a portion of the lock for the pedal lever; Fig. 5 is a sectional view of the same taken on the line 5—5 of Fig. 4, this section being indicated by the line 5—5 of Figs. 1 and 2; Fig. 6 is a bottom plan view of a cushion stop for the pedal lever, and Fig. 7 is a side view of the key for operating the pedal lock.

In the accompanying drawing, the greater portion of the safety car control equipment is omitted, but it will be understood that this equipment may be identical with that fully disclosed in my pending application for Letters Patent for safety car control equipment, filed September 28, 1929, and Serially Numbered 395,775, and that my improved pedal lever may be substituted for the pedal lever 4 of this pending application.

Referring now in detail to the drawing, the reference character 1 indicates the car floor, to the underside of which, is secured a fulcrum bracket 2 having spaced downwardly depending connected lugs 3. Anchored in the lower ends of these lugs is a fulcrum in the form of a bolt 4 on which the inner end of the pedal lever 5 is pivotally mounted.

The inner end of the pedal lever 5 is provided with an arm 6 to which, at a point above the pin 4, is operatively connected a rod 7, which may correspond to the rod 30 of my aforementioned pending application.

The outer or free end of the pedal lever 5 is provided with an extension 8, which extends upwardly through an opening 9 in the floor 1 and through an opening 10 formed in a latch plate or member 11 rigidly secured to the upper side of the floor 1. This extension 8 is preferably of tubular form and throughout its length is curved in the arc of a circle struck from a point corresponding to the axis of the fulcrum pin 4.

Pivotally connected to the upper end of the extension 8, through the medium of a pin 12, is a latch member 13. Beyond the upper end of the extension 8 there is secured to one end of the latch member 13 a foot plate or pad 14 which is adapted to be engaged by a foot of an operator for controlling the operation of the pedal lever. The other end of this latch member is provided with a latch tooth 15 which is adapted to be operated into engagement with a lug 16 on the latch plate 11 when the pedal lever is depressed to service position, and when in such engagement, prevents movement of the pedal lever to foot off or emergency position if the operator should remove his foot from the foot plate 14.

In the present embodiment of the invention and as shown in the drawing, the extension 8 is made from relatively thin metal, which would not be serviceable as a bearing for the pivot pin 12. To provide a suitable bearing for this pin, an annular member 17 is provided which fits over the upper end portion of the extension, said member having an annular lug 18 abutting the extreme upper edge of the extension 8. The pin 12 passes through openings in this member 17 and its ends extend into spaced lugs 19 on the foot plate 14. It will be noted that the operating pressure on the foot plate 14 is transmitted to the extreme upper end of the extension 8 through the medium of the latch pin 12, member 17 and lug 18 of the member 17, so that the relatively thin metal of the extension 8 is not relied upon to serve as a bearing for the pin 12.

Adjacent the extension 8, the pedal lever 5 is provided with a stop 20, which is adapted to engage a stop cushion 21, removably secured in a pocket formed in the latch plate 11, by an annular clamping plate 22 secured to the latch plate by screws 23, for limiting the upward movement of the pedal lever 5 when the operator's foot is removed from the foot plate 14.

The member 16 is preferably in the form of a stud bolt and has screw-threaded connection with the pedal lever, so that it may be adjusted in the direction of its length, said member being maintained in adjusted position by a nut 24.

In the drawing, the pedal lever is shown in brake releasing position, and in running the car is maintained in this position by the operator's foot pressure. By increasing his foot pressure, the operator may depress the pedal lever to service position to effect a service application of the brakes, and by removing his foot from the pedal lever, said lever will move to foot off emergency position, the safety car control equipment embodying means acting through the rod 7 to move the pedal lever to foot off position.

If when the pedal lever is in service position, and the operator desires to maintain it in this position without maintaining his foot pressure thereon, he must first operate the latch member 13 into holding engagement with the latch plate 11, and to do this, he rotates the latch member relative to the extension 8 in a clockwise direction about the pivot pin 12, causing the tooth 15 of the latch member to engage the under side of the lug 16.

Under certain conditions, such as when changing ends, it is desirable to lock the foot pedal in its forward position to prevent it from being operated by an unauthorized person and for this purpose a lock mechanism is provided which is movable into and out of locking engagement with the foot pedal through the medium of a removable key 24 which is carried by the operator or any other authorized person.

The lock mechanism may comprise a hollow barrel 25, which is rotatably mounted in the latch plate 11, the interior of said barrel being divided into chambers 26 and 27 by a wall 28 having an opening 29 formed therein eccentric to the axis of the barrel. Intermediate its ends the barrel is provided with a hollow projection 30 within which a locking member or latch 31 is slidably mounted, there being a pin 32 secured to the projection and extending through a slotted opening 33 in the latch for limiting the outward movement of the latch relative to the projection.

The latch 31 is constantly urged outwardly by the pressure of a spring 34 contained in the projection 30. The outer end portion of the latch 31, when the lock mechanism is in pedal unlocking position, as shown in Fig. 2, engages the latch plate 11 within a notch 46. The inner end of the latch extends into an opening in the wall of the barrel 25. To prevent the lock mechanism from being accidentally moved from its unlocked position, there is contained in the chamber a plunger 35 with which the inner end of the latch 31 engages should the latch be moved inwardly, thus maintaining the lock mechanism in unlocked position.

Th plunger 35 is slidably mounted in the chamber 26 of the barrel 25 and is constantly urged toward its latch maintaining position, as shown in detail in Fig. 5, by the pressure of a spring 36 also contained in the chamber 26.

The key 24 for operating the locking mechanism comprises a shank 37 having at one end, wings 38, through the medium of which, the key may be rotated, and having at the other end, a projection 39, which is arranged eccentrically of the axis of the shank 37, said projection being adapted to be passed through the opening 29 in the wall 28 of the barrel 25. Intermediate the projection 39 and the wings 38, the shank 37 is provided with a lug 40, which is adapted to operatively engage the barrel 25 when the key is inserted to operate the lock mechanism.

Assuming now that the foot pedal is held in its forward or service position by the tooth 15 of the latch 13 engaging the lug 16 of the latch plate 11, and it is desired to lock the pedal in this position against operation by an unauthorized person, the operator inserts the key 24 through an opening 41 in the latch plate 11 and barrel 25, so that the projection 39 of the key will pass through the opening 29 and into engagement with the plunger 35. With the key in this position, the lug 40 of the shank 39 is adapted to pass through a notch 42 formed in the latch plate and into engagement with one end of the barrel 25 within a notch 43.

The operator now forces the key inwardly, so that the projection 39 thereof will cause the plunger 35 to be shifted beyond the inner end of the locking latch 31 against the pressure of the spring 36, thus permitting the latch to be moved inwardly. When the plunger is thus moved out of the path of travel of the locking latch 31, the lug 40 of the key will have passed through the notch 42 and free of the latch plate and into operative engagement with the barrel 25 within the notch 43.

With the key thus positioned, it is rotated in a clockwise direction, causing the barrel 25 to be rotated in the same direction. As the barrel is thus rotated, the locking latch 31, by reason of its engagement with the latch plate 11, will be forced inwardly against the pressure of the spring 34 until the latch is clear of the plate 11, when the spring will again force it outwardly. Now, as the latch engages the foot controlled latch member 13, it is again forced inwardly until the barrel 25 has been rotated a sufficient distance that the latch 31 is in registration with a notch 44 formed in the member 13, at which time the pressure of the spring 34 causes the locking latch 31 to move into locking engagement with the member 13 within the notch 44.

When the locking latch 31 is in locking engagement with the member 13, the key 24 is removed, the lug 40 of the key, as the key is withdrawn, passing through a notch 45 formed in the latch plate 11. As the key is withdrawn, the pressure of the spring 36 shifts the plunger 35 to its normal position in the path of travel of the locking latch 31 and prevents rearward movement of the locking latch, thus maintaining the foot pedal lever locked in its forward position until unlocked through the medium of the key 24.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a fixed part of a vehicle, of a brake controlling pedal lever normally maintained in a brake releasing position by the foot pressure of an operator and movable to a brake applying position upon an increase in the operator's foot pressure and further movable to another brake applying position upon the entire relief of the operator's foot pressure, a member pivotally carried by said pedal lever through which the operator's foot pressure is transmitted to the pedal lever and which is rotatable relative to said pedal lever into engagement with the fixed part of the vehicle when the pedal lever is in its first mentioned brake applying position for holding the pedal lever against movement toward its other positions upon the relief of the operator's foot pressure, and means rotatably mounted in said fixed part of the vehicle for locking said member in its pedal lever holding position.

2. The combination with a fixed part of a vehicle, of a brake controlling pedal lever normally maintained in a brake releasing position by the foot pressure of an operator and movable to a brake applying position upon an increase in the operator's foot pressure and further movable to another brake applying position upon the entire relief of the operator's foot pressure, a member pivotally carried by said pedal lever through which the operator's foot pressure is transmitted to the pedal lever and which is rotatable relative to said pedal lever into engagement with the fixed part of the vehicle when the pedal lever is in its first mentioned brake applying position for holding the pedal lever against movement toward its other positions upon the relief of the operator's foot pressure, means rotatably mounted in said fixed part of the vehicle for locking said member in its pedal lever holding position, and a removable device for operating said means.

3. The combination with a fixed part of a vehicle, of a brake controlling pedal lever comprising a hollow extension made from thin material, of a rockable member for applying pressure to said lever for operating the lever in one direction and operable into engagement with the fixed part of the vehicle for locking the lever in adjusted position, and means for applying the pressure transmitted through said member to the end edge of said extension.

4. The combination with a fixed part of a vehicle, of a brake controlling pedal lever having a brake applying position, a latch member carried by said pedal lever through which power is applied to the lever and which is movable relative to the pedal lever into engagement with the fixed part of the vehicle for holding said pedal lever in its brake applying position, and a lock mechanism carried by said fixed part of the vehicle for locking said latch member in its pedal lever holding position, said lock mechanism comprising a locking latch movable into engagement with said latch member, and means for locking said locking latch in locking engagement with said latch member.

5. The combination with a fixed part of a vehicle, of a brake controlling pedal lever having a brake applying position, a latch member carried by said pedal lever and movable relative thereto into engagement with the fixed part of the vehicle for holding said pedal lever in its brake applying position, and a lock mechanism carried by said fixed part of the vehicle for locking said latch member in its pedal lever holding position, said lock mechanism comprising a locking latch movable into engagement with said latch member, means for locking said locking latch in locking engagement with said latch member, and a key insertable in said lock mechanism for moving said means out of locking relation with said locking latch.

6. The combination with a fixed part of a vehicle, of a brake controlling pedal lever having a brake applying position, a latch member carried by said pedal lever and movable relative thereto into engagement with the fixed part of the vehicle for holding said pedal lever in its brake applying position and a lock mechanism carried by said fixed part of the vehicle for locking said latch member in its pedal lever holding position, said lock mechanism comprising a locking latch movable into engagement with said latch member, means for locking said locking latch in locking engagement with said latch member, and a key insertable in said lock mechanism for moving said means out of locking relation with said locking latch and for operating the lock mechanism out of engagement with said latch member.

7. The combination with a fixed part of a vehicle, of a brake controlling pedal lever having a brake applying position, a latch member carried by said pedal lever and movable relative thereto into engagement with the fixed part of the vehicle for holding said pedal lever in its brake applying position, and a lock mechanism carried by said fixed part of the vehicle for locking said latch member in its pedal lever holding position, said lock mechanism comprising a locking latch movable into engagement with said latch member, means for locking said locking latch in locking engagement with said latch member, and a key insertable in said lock mechanism for moving said means out of locking relation with said locking latch and for operating the lock mechanism out of engagement with said latch member into engagement with said fixed part of the vehicle, said means being movable into locking relation with the locking latch upon the withdrawal of said key from the lock mechanism.

In testimony whereof I have hereunto set my hand, this 19th day of May, 1930.

JOSEPH C. McCUNE.